(12) United States Patent
Bargas et al.

(10) Patent No.: US 9,454,521 B1
(45) Date of Patent: *Sep. 27, 2016

(54) SYSTEMS AND METHODS FOR CREATING DOCUMENTS FROM TEMPLATES

(71) Applicant: United Services Automobile Association (USAA), San Antonio, TX (US)

(72) Inventors: Isauro Bargas, San Antonio, TX (US); Maheshwer Annamalai, Tamil Nadu (IN); Anil C. Abraham, Kerala (IN)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,452

(22) Filed: Aug. 20, 2013

Related U.S. Application Data

(63) Continuation of application No. 13/231,694, filed on Sep. 13, 2011, now Pat. No. 8,516,007, which is a continuation of application No. 12/099,317, filed on Apr. 8, 2008, now Pat. No. 8,037,101.

(51) Int. Cl.
*G06F 17/30* (2006.01)
*G06F 17/24* (2006.01)

(52) U.S. Cl.
CPC .................................. *G06F 17/248* (2013.01)

(58) Field of Classification Search
CPC combination set(s) only.
See application file for complete search history.

(56) References Cited

U.S. PATENT DOCUMENTS

| | | | | |
|---|---|---|---|---|
| 2001/0034771 A1* | 10/2001 | Hutsch | ............... | G06F 9/541 709/217 |
| 2004/0001106 A1* | 1/2004 | Deutscher | ......... | G06F 17/30017 715/838 |
| 2004/0120013 A1* | 6/2004 | Elkady | ............... | G06K 15/00 358/1.18 |
| 2006/0053369 A1* | 3/2006 | Kalajian | ............. | G06F 17/2205 715/243 |
| 2006/0193008 A1* | 8/2006 | Osaka | ............... | G06F 17/211 358/1.18 |
| 2007/0077665 A1* | 4/2007 | Bump | ............. | G05B 19/41845 438/14 |
| 2007/0260575 A1* | 11/2007 | Robinson | .......... | G06F 17/30348 |

* cited by examiner

*Primary Examiner* — Shyue Jiunn Hwa
(74) *Attorney, Agent, or Firm* — Baker & Hostetler LLP

(57) ABSTRACT

A merge application creates a particular set of documents for a particular matter. The merge application receives a selection of a particular master template corresponding to the particular set of documents, where the selected master template specifies a plurality of slave templates, and also receives a selection of a data structure from a database with data relating to the particular matter. The selected master template and the selected data structure are employed to produce the set of documents for the particular matter in an electronic form, where a corresponding document of the set is produced for each specified slave template in the selected master template. Each corresponding document is produced according to common content in the slave template and data in the selected data structure in the database referred to by placeholders in the slave template.

17 Claims, 5 Drawing Sheets

SYSTEMS AND METHODS FOR CREATING DOCUMENTS FROM TEMPLATES

CROSS-REFERENCE TO RELATED APPLICATION(S)

The present application is a Continuation of U.S. patent application Ser. No. 13/231,694, filed Sep. 13, 2011, now U.S. Pat. No. 8,516,007, which is a Continuation of U.S. patent application Ser. No. 12/099,317 filed on Apr. 8, 2008, now U.S. Pat. No. 8,037,101, and shares a common title and disclosure with the following applications, each of which is hereby incorporated herein by reference in its entirety:

U.S. patent application Ser. No. 12/099,309, filed on Apr. 8, 2008, now U.S. Pat. No. 8,051,103; and U.S. patent application Ser. No. 12/099,311, filed on Apr. 8, 2008, now U.S. Pat. No. 7,933,930.

FIELD

The present disclosure is directed to systems and methods that create electronic documents from electronic templates, and particularly complex electronic documents. More particularly, the present disclosure is directed to such systems and methods that create documents from templates that are not associated with any particular document production application.

BACKGROUND

It is known that an electronic document may be created from an electronic template. For example, in the context of a word processing application that creates primarily textual documents, it is known that a template may be employed so as to automate a task that may be repeated on a regular or irregular basis. Thus, a person may create an electronic document such as a letter to be mailed to another person, where the letter is a standard or 'form' letter with text or the like that is substantially unvarying across multiple similar letters, by directing a word processing application or the like to retrieve a template associated with such application and containing the substantially unvarying text.

As may be appreciated, the text in such a template may be formatted in a particular manner, such as for example in paragraphs of a particular type or 'style', within pages having predefined margins, headers, footer and the like, with certain colors, etc. As may also be appreciated, the template may also have non-textual elements, such as for example a picture, a logo, or the like. Moreover, such a template may include references or 'bookmarks' to other templates, where each bookmark for example refers to text or other content that does not vary among different templates and documents, such as for example a list of members of a firm, a list of owners, an address of an office, a drawing of a directional map, etc.

As should be understood, each document created from a common template may have common information and also unique information. For example, a form letter sent to multiple people may have a common body, but may differ based on each person to whom the form letter is sent. Thus, the form letter as sent to each person may refer to that person by name in a salutation, and may include a mailing address and/or electronic mail address of such person. To effectuate such unique information in a document created from a template, then, the template typically includes merge codes or the like by which such unique features are automatically entered by way of reference to a data file. In the latter case, and as an example, a template for creating a form letter to be sent to each of multiple persons may include merge codes to retrieve the name and address of each such person from a text document that has already been created and properly formatted.

In connection with a particularly complex task, the templates for effectuating such task also may be particularly complex. For example, if a task involves producing a number of documents to be directed to a number of different persons, the task may be performed by way of a so-called 'master' template that refers to a number of individual 'slave' templates, where each slave template produces a corresponding document. Notably, the master template and/or the slave templates may include functional code that performs certain actions, such as for example retrieving and/or querying for information to be inserted into the documents created from such templates. Also notably, such information to be inserted may be found in a particular data file which is a text document that has already been created and properly formatted.

As an example, a particularly complex task to be performed may be to construct a number of different legal documents, each of which is to be sent to certain parties. Thus, it may be that a first one of the documents is to be sent to party A, a second one to parties A and B, and a third one to parties C, D, and E. Accordingly, the master template would reference three slave templates, one each to produce the first, second, and third documents, respectively. In operation, and as is known, the master template would among other things direct that the slave template create the first document with the name and address of party A, the second document with the name and address of each of parties A and B, and the third document with the name and address of each of parties C, D, and E, all as found in a corresponding data file. Typically, to create all of the documents based on the master template and corresponding data file, an appropriate run command would be executed that identifies such master template and corresponding data file.

With such master templates, slave templates, and data files, then, particularly complex collections of documents may be constructed from corresponding templates and data files with relative ease by way of an underlying application. Note, though, that to do so, the templates and data files must first themselves be constructed. Typically, although not necessarily, all of the templates and data files are constructed in a format related to the underlying application. For example, if the underlying application is a particular word processing application, then the templates would be constructed according to a template format specific to the particular word processing application, and the data file would be constructed according to a data file format specific to the particular word processing application.

As should be understood, however, such a situation is disadvantageous in at least two regards. For one, constructing templates and data files according to respective formats specific to a particular underlying application may unnecessarily restrict such templates and data files to use only with such particular underlying application, when in fact it may be advantageous to be able to use such templates and data files with other underlying applications. For another, constructing templates and data files according to respective formats specific to a particular underlying application may unnecessarily restrict such templates and data files from producing documents across multiple underlying applications. In the former case, if the underlying application becomes obsolete or otherwise unusable, then the templates and data files are likewise obsolete or otherwise unusable. In the latter case, it may be advantageous to be able to use a single template, for example, to create a letter by way of a word processing application and also to create a presentation according to an unrelated presentation application.

Accordingly, a need exists for systems and methods for creating documents that employ templates and data files constructed and/or maintained in a format that is not specific to any particular underlying application. More particularly, a need exists for such systems and methods where each template and data file is in an independent format. Even more particularly, a need exists for such systems and methods where the data file is embodied within an appropriate database.

SUMMARY

The aforementioned needs are satisfied at least in part by a system and method that creates a particular set of documents for a particular matter. Each document is created by a corresponding underlying application, and data relating to the particular matter is collected and organized into a corresponding data structure in a database. A merge application is instantiates on a computing device. The merge application receives a selection of a particular master template corresponding to the particular set of documents, where the selected master template specifies a plurality of slave templates, and also receives a selection of the data structure from the database with the data relating to the particular matter.

The merge application employs the selected master template and the selected data structure to produce the set of documents for the particular matter in an electronic form, where a corresponding document of the set is produced for each specified slave template in the selected master template. Each corresponding document is produced according to common content in the slave template and data in the selected data structure in the database referred to by placeholders in the slave template. In various embodiments, the merge application is independent of the underlying application of each document, each template is specified in a format independent of the underlying application of each document, and the data structure in the database is specified in a format independent of the underlying application of each document.

BRIEF DESCRIPTION OF THE DRAWINGS

The foregoing summary, as well as the following detailed description of various embodiments of the present innovation, will be better understood when read in conjunction with the appended drawings. For the purpose of illustrating the embodiments, there are shown in the drawings embodiments which are presently envisioned. As should be understood, however, the embodiments of the present innovation are not limited to the precise arrangements and instrumentalities shown. In the drawings.

DETAILED DESCRIPTION

Example Computing Environment

Figure 1:
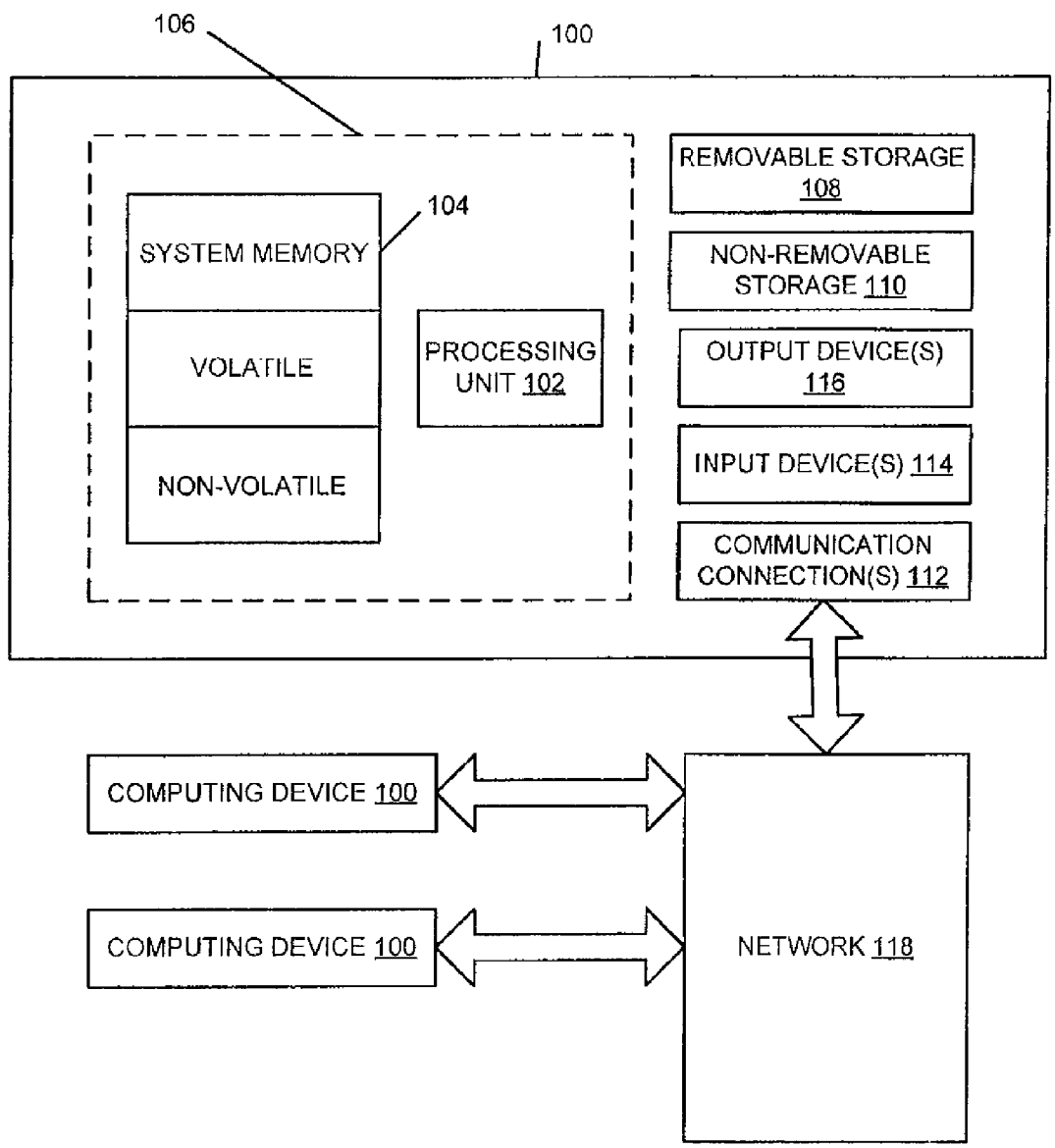
FIG. 1 is a block diagram of an example of a computing environment within which various embodiments of the present innovation may be implemented.

FIG. 1 is set forth herein as an exemplary computing environment in which various embodiments of the present innovation may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Creating Documents from Templates

Figure 2:
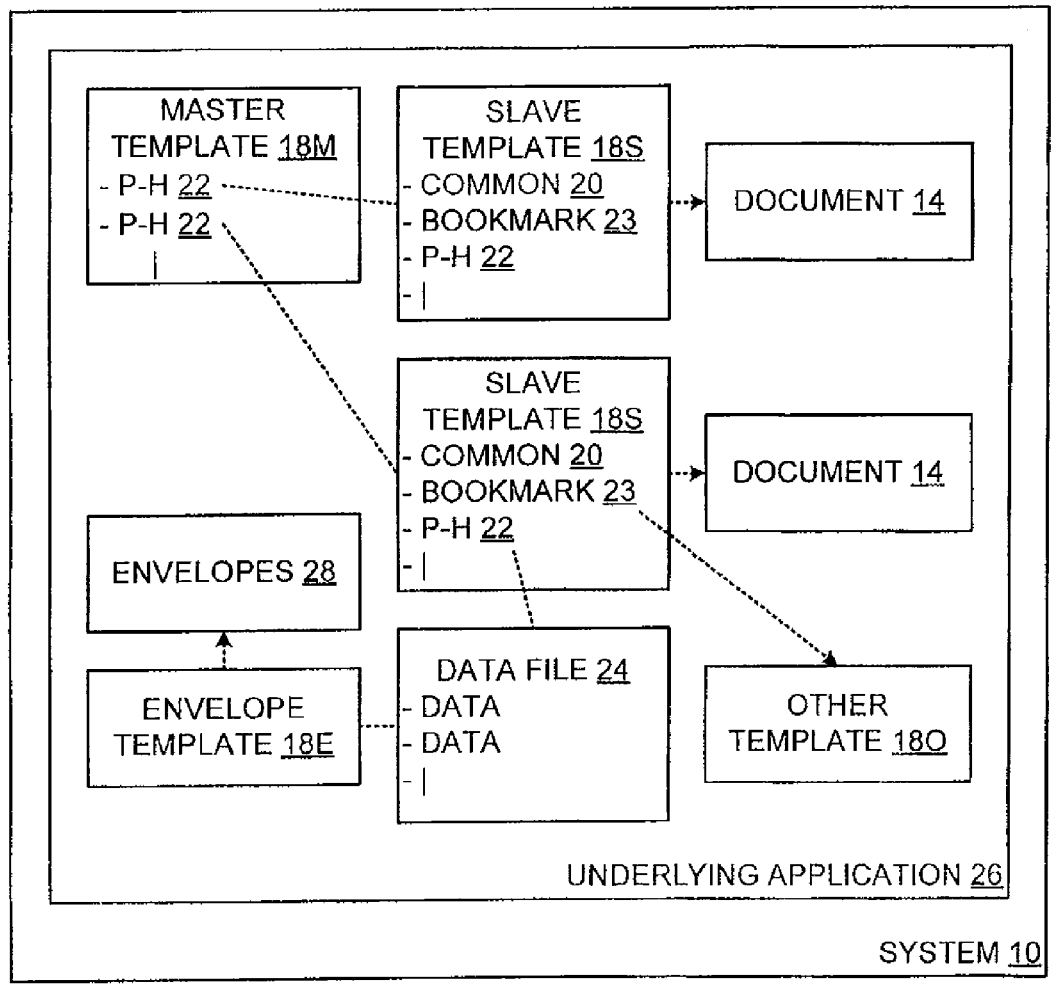
FIG. 2 is a block diagram of a system including an underlying application that employs a master template, slave templates, and a data file formatted according to the underlying application to produce a set of documents in accordance with the prior art.

As was set forth above, and referring now to FIG. 2, a system 10 may be provided to create a set of documents 14 as a single task based on a set of templates including a master template 18*m* and a number of slave templates 18*s*. As should be understood, the set of documents 14 to be created may be most any documents without departing from the spirit and scope of the present innovation. For one example, in a real estate office, the set of documents 14 may relate to the sale of a piece of real estate, and may therefore include textual documents 14 including a deed, a contract of sale, a mortgage agreement, and various notices, rider, covenants, and the like, a spreadsheet document 14 setting forth projected mortgage payments, a visual document 14 showing a picture of the piece of real estate, a drawing document 14 showing a drawing of the metes and bounds of the land included with the piece of real estate, and the like. For another example, in a legal office, the set of documents 14 may relate to a lawsuit, and may therefore include textual documents 14 including a letter to opposing counsel, a letter to a client, a letter to a third party, a request for production of certain items, a set of interrogatories, notice of depositions for several witnesses, and the like, a drawing document 14 showing a map of an area where an incident took place, and the like.

Notably, each document 14 includes features common across multiple similar documents 14. For example, the contract of sale includes much form text that appears in all contracts of sale, the drawing of the land includes a legend that appears in all drawings of land, the set of interrogatories includes questions commonly asked, and the like. Accordingly, and in various embodiments of the present innovation, each such document 14 is produced based on a corresponding slave template 18*s*, and the master template 18*m* controls the creation of the set of such documents 14.

As was alluded to above, and as is known, each slave template 18*s* includes common content 20 ('COMMON 20' in the drawings), such as formatted text, pictures, drawings, headers, footers, margins, and the like that is to appear in a corresponding document, as well as placeholders 22 ('P-H 22' in the drawings) for data to be inserted in appropriate locations within the corresponding document. As should be understood, each placeholder 22 is akin to a 'merge code' and refers to specific data that is already present elsewhere in a data structure 24 or the like and presumably electronically accessible. Such referred-to data may be most any appropriate data without departing from the spirit and scope of the present innovation. For example, one placeholder 22 may refer to the name of a person, while another placeholder 22 may refer to the address of a piece of real estate.

As is known, each slave template 18s may also include references or 'bookmarks' 23 to other templates 18o, where each bookmark 23 for example refers to text or other content that does not vary among different slave templates 18s and documents 14 produced therefrom, such as for example a list of members of a firm, a list of owners, an address of an office, a drawing of a directional map, etc. Thus, each slave template 18s with common content 20, placeholders 22, and bookmarks 23 therein may be employed multiple times to create differing corresponding documents 14, where each differing corresponding document 14 is differentiated according to the inserted data at the placeholders 22 in such slave template 18s.

As was also alluded to above, and as is also known, the master template 18m in particular specifies by way of appropriate placeholders 22 which slave templates 18s are employed and by extension which documents 14 are produced. Additionally, the master template 18m may include additional features, such as for example to impart a common thematic style to the document 14 produced by each specified slave template 18s, and also to perform certain functions, among other things. Notably, a first master template 18m may employ a particular slave template 18s in a first manner, and a second master template 18m may employ the same particular slave template in a second manner different from the first. Thus, each master template 18m may be employed multiple times to create a differing set of corresponding documents 14, where each differing set of corresponding document 14 is differentiated according to the inserted data at the placeholders 22 in the slave template 18s referred to by the placeholders 22 in the master template 18m.

Typically, all of the referred-to data that placeholders 22 may refer to for a particular matter is collected and stored in a single data structure 24 corresponding to the particular matter. In the prior art, the data structure 24 was a data file 24, each document 14 produced by way of the master template 18m was in fact produced according to an underlying application 26, and the templates 18m, 18s and the data file 24 were each in a specific format particular to the underlying application 26. For example, if the underlying application 26 was a word processing application, the templates 18m, 18s were word processing templates and the data file 26 was a word processing file or the like.

Figure 3:
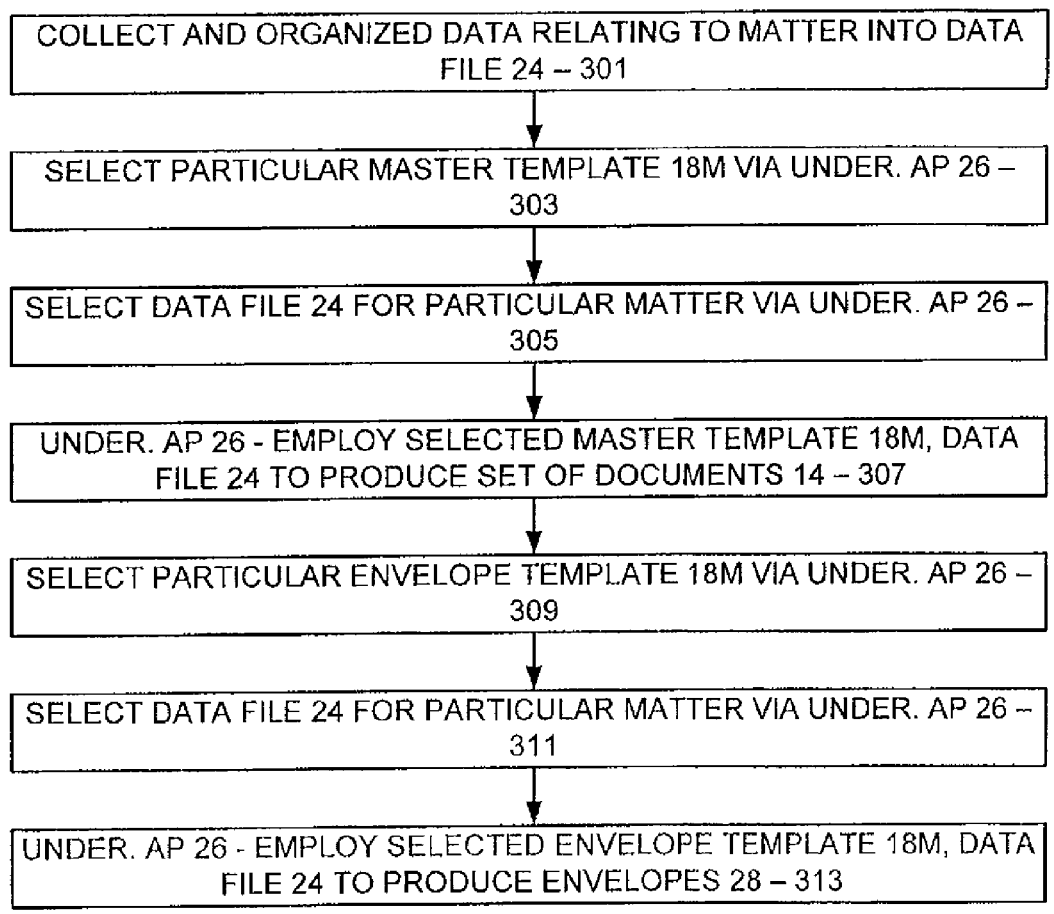
FIG. 3 is a flow diagram showing key actions performed in the prior art in connection with the system of FIG. 2.

Thus, to create a particular set of documents 14 for a particular matter in the prior art, and turning now to FIG. 3, all of the data relating to the matter would first be collected and organized into a corresponding data file 24 (301). Such data in the data file 24 would of course be organized in a particular manner so that the data in such data file 24 is accessible to the underlying application 26. Such collecting and organizing of such data is known or should be apparent to the relevant public and therefore need not be set forth herein in any detail.

With such a data file 24, then, a person at a computing device 100 with the underlying application 26 instantiated thereon would then select a particular master template 18m by way of the application 26 (303) and also select the data file 24 for the particular matter by way of the application 26 (305), and the application 26 would then employ the selected master template 18m and selected data file 24 to produce the set of documents 14 in an electronic form (307) which may then be printed as desired. As should be understood, the selected master template 18m specifies a number of specific slave templates 18s, and for each specified slave template 18m a corresponding document 14 is produced according to the common content 20 in the slave template 18s, the content from other templates 18o referred to by the bookmarks 23 in the slave template 18s, and the data in the selected data file 24 referred to by the placeholders 22 in the slave template 18s. An underlying application 26 producing a set of documents 14 based on a master template 18m, slave templates 18s as referred to by the master template 18m, and data in a data file 24 as referred to by the slave templates 18s is generally known or should be apparent to the relevant public and therefore need not be set forth herein in any detail.

In a related manner, and again with such a data file 24, a person at a computing device 100 with the underlying application 26 instantiated thereon could also select a particular envelope template 18e by way of the application 26 (309) and also select the data file 24 for the particular matter by way of the application 26 (311), and the application 26 would then employ the selected envelope template 18e and selected data file 24 to produce envelopes 28 corresponding to the produced documents 14 in an electronic form (313) which may then be printed as desired, particularly if the produced documents 14 are to be delivered in a hard copy form.

As should be understood, the envelope template 18e would correspond to the selected master template 18m and would produce an envelope 28 for each document 14, where the produced envelope 28 would be addressed to the recipient of the document 14. As before, an underlying application 26 producing envelopes 28 based on an envelope template 18e and data in a data file 24 is generally known or should be apparent to the relevant public and therefore need not be set forth herein in any detail.

As was set forth above, it was typical in the prior art that the templates 18m, 18s, 18o, 18e, etc. and the data file 24 were constructed in a format related to the underlying application 26. For example, and again, if the underlying application 26 was a particular word processing application 26, then the templates would be constructed according to a template format specific to the particular word processing application 26, and the data file 24 would be constructed according to a data file format specific to the particular word processing application 26. As a result, such templates and data file 24 were not usable with other word processing applications 26 or with other applications in general.

That is, constructing templates 18m, 18s, 18o, 18e, etc. and data files 24 according to respective formats specific to a particular underlying application 26 unnecessarily restricts such templates and data files 24 to use only with such particular underlying application 26, when in fact it would be advantageous to be able to use such templates and data files with other underlying applications 26. For example, the data files 24 in particular could be used in connection with multiple underlying applications 26 but for the aforementioned restriction. Perhaps more significantly, restricting the templates and data files 24 to the underlying application 26 can be dangerous if such underlying application 26 becomes obsolete or otherwise unusable, in which case the templates and data files 24 are essentially unusable.

Additionally, constructing templates 18m, 18s, 180, 18e, etc. and data files 24 according to respective formats specific to a particular underlying application 26 unnecessarily restricts such templates and data files 24 from producing documents across multiple underlying applications 26. For example, a master template 18m should be able to produce a set of documents 14 including a word processing document 14 and a presentation document 14. Similarly, a data file 24 should be usable by any slave template 18s regardless of the respective formats.

Figure 4:
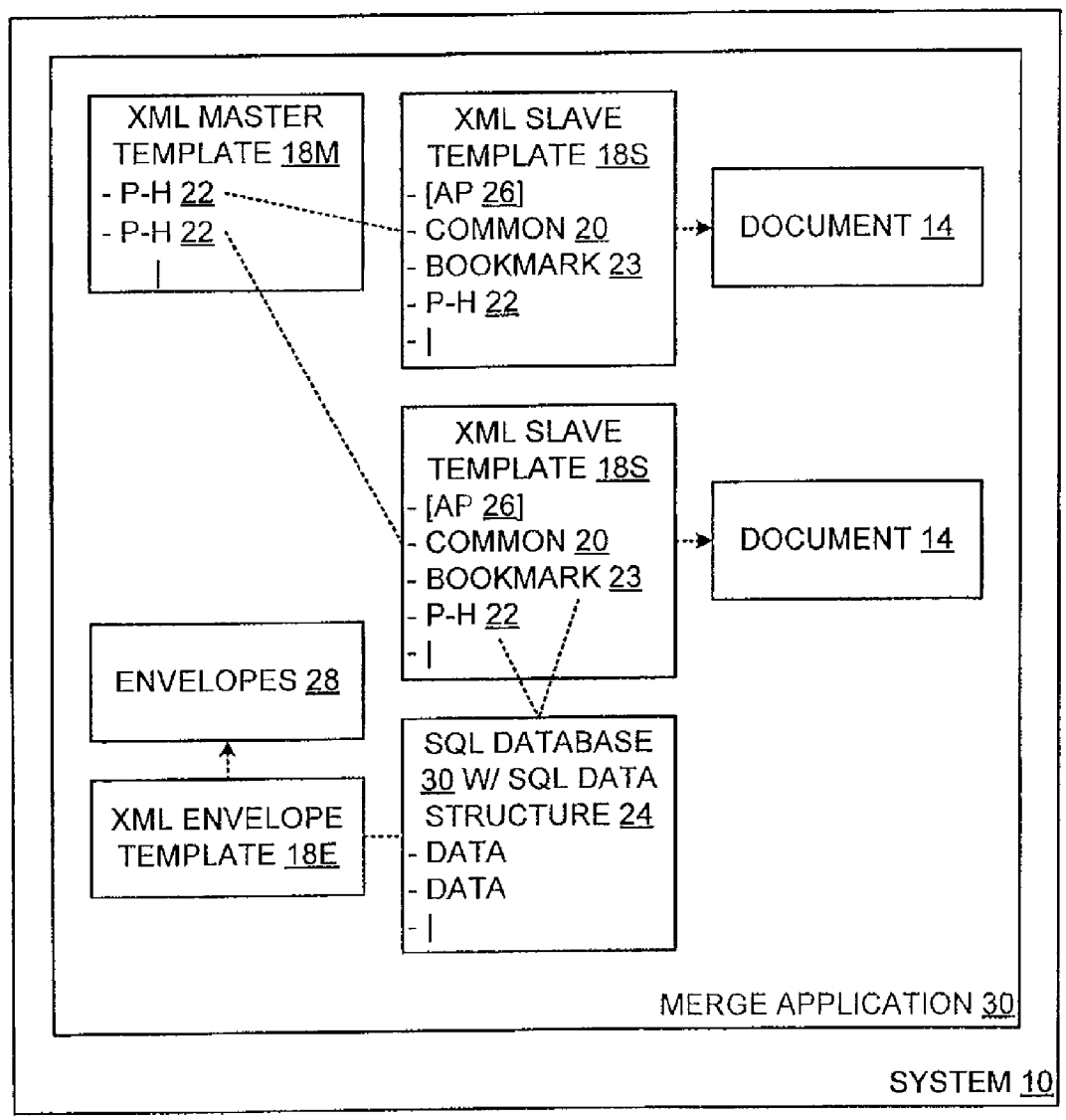
FIG. 4 is a block diagram of a system including an independent merge application that employs a master template and slave templates in an XML format and a data structure from a database to produce a set of documents in accordance with various embodiments of the present innovation.

Accordingly, in various embodiments of the present innovation, and turning now to FIG. 4, the templates 18m, 18s, 18o. 18e, etc. and the data files 24 are in a format that is independent of any particular underlying application 26. Accordingly, such templates and data files 24 are not restricted to use by any particular underlying application 26. Instead, and in various embodiments of the present innovation, the templates and data files 24 are directly employed by an independent merge application 30. While the templates in particular might specify that a particular underlying application 26 be employed in connection therewith, such a specified particular underlying application 26 is not believed to be required in all instances.

In various embodiments of the present innovation, each template 18m, 18s, 18o, 18e, etc. is formatted according to an extensible markup language (XML) format that is not specific to any particular underlying application 26. Accordingly, most any underlying application 26 may be employed in connection with the template, presuming of course that the underlying application 26 has the requisite functionality necessary to be so employed. Notably, the use of XML for templates 18m, 18s, 180, 18e, etc. provides an additional benefit in that a template set forth as an XML document is more easily remotely accessible, such as by way of an inter-network computing system such as the Internet.

Also, in various embodiments of the present innovation, each data file 24 is in fact a data structure 24 resident in a database 32, such as for example a SQL database, although other databases may be employed. Accordingly, and again, most any underlying application 26 may be employed in connection with the data structure 24 from such a database 32, presuming again that the underlying application 26 has the requisite functionality necessary to be so employed. Here too, the use of a data structure 24 within a database 32 provides the aforementioned additional benefit that such a data structure 24 and database 32 are more easily remotely accessible, such as by way of an inter-network computing system such as the Internet.

Further, in various embodiments of the present innovation, each bookmark 23 in a slave template 18s refers to a data entry in the database 32 and not to any other templates 180. Thus, updating a bookmark 23 is performed by updating the corresponding data entry in the database 32, and not by updating any other template 180.

Figure 5:
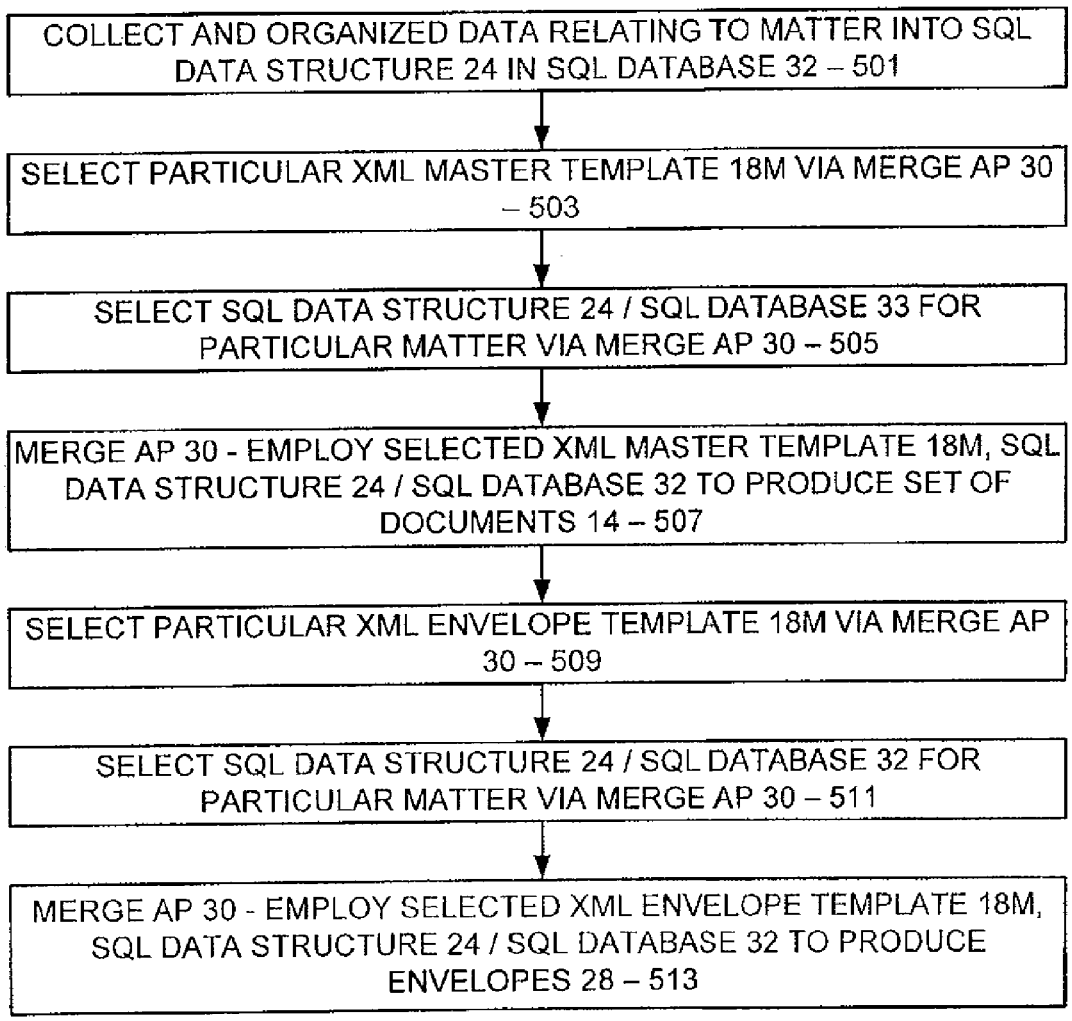
FIG. 5 is a flow diagram showing key actions performed in connection with the system of FIG. 4 in various embodiments of the present innovation.

Thus, to create a particular set of documents 14 for a particular matter in various embodiments of the present innovation, and turning now to FIG. 5, all of the data relating to the matter would first be collected and organized into a corresponding data structure 24 in a database 32 (501). Here, such data in the data structure 24 in the database 32 would be organized in a particular database manner so that the data in such data structure 24 is accessible to whatever application 26, 30, etc. that would in fact access such data. Moreover, inasmuch as the data in the data structure 24 is independent of any particular underlying application 26, most any application 26 could at least potentially access such data presuming such application 26 includes the requisite functionality to access such data structure 24 from such database 32. Collecting and organizing of such data in such data structure 24 and database 32 is known or should be apparent to the relevant public and therefore need not be set forth herein in any detail.

With such a data structure 24 and database 32, then, a person at a computing device 100 with the independent merge application 30 instantiated thereon would then select a particular master template 18m by way of the application 30 (503) and also select the data structure 24/database 32 for the particular matter by way of the application 30 (505), and the application 30 would then employ the selected master template 18m and selected data structure 24 to produce the set of documents 14 in an electronic form (507) which may then be printed as desired. As before, the selected master template 18m specifies in an XML format or the like a number of specific slave templates 18s, and for each specified slave template 18m a corresponding document 14 is produced according to the common content 20 in an XML format or the like in the slave template 18s, the data entries in the database 32 referred to by the bookmarks 23 in the slave template 18s, and the data in the selected data structure 241 database 32 referred to by the placeholders 22 in the slave template 18s.

A merge application 30 independent of any underlying application 26 and producing a set of documents 14 based on a master template 18m in an XML format or the like, slave templates 18s in an XML format or the like as referred to by the master template 18m, and data in a data structure 24/database 32 as referred to by the slave templates 18s should be apparent to the relevant public and therefore need not be set forth herein in any detail. Again, although the merge application 30 is independent of any particular underlying application 26, each template 18m, 18s, 18o, 18e, etc. in an XML format or the like may refer to a particular underlying application 26 if need be to effectuate processes required by such template.

Similar to before, with such a data structure 24, a person at a computing device 100 with the independent merge application 30 instantiated thereon could also select a particular envelope template 18e by way of the application 30 (509) and also select the data structure 24/database 32 for the particular matter by way of the application 30 (511), and the application 30 would then employ the selected envelope template 18e in an XML format or the like and selected data structure 24/database 32 to produce envelopes 28 corresponding to the produced documents 14 in an electronic form (513) which may then be printed as desired, particularly if the produced documents 14 are to be delivered in a hard copy form.

As should be understood, the envelope template 18e in an XML format or the like would correspond to the selected master template 18m and would produce an envelope 28 for each document 14, where the produced envelope 28 would be addressed to the recipient of the document 14. As before, a merge application 26 producing envelopes 28 based on an envelope template 18e in an XML format or the like and data in a data structure 24/database 32 should be apparent to the relevant public and therefore need not be set forth herein in any detail.

CONCLUSION

The programming believed necessary to effectuate the processes performed in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, systems and methods are provided for creating sets 12 of documents 14 that employ templates 18m, 18s, 18o, 18e, etc. in an XML format and data structures 24 in databases 32, where the templates and data structures 24 are constructed and/or maintained in an independent format that is not specific to any particular underlying application 26. It should be appreciated that changes could be made to the embodiments described above without departing from the innovative concepts thereof. For one example, although the present innovation is set forth in terms of possible use of an underlying application 26 by a template in an XML format, such template may in fact require only the merge application 30 and no underlying application 26 without departing from the spirit and scope of the present innovation. It should be understood, therefore, that this innovation is not limited to the particular embodiments disclosed, but it is intended to cover modifications within the spirit and scope of the present innovation as defined by the appended claims.

The invention claimed is:

1. A method comprising:
receiving, at a merge application, a selection of a master document template specifying a plurality of slave document templates;
receiving, at the merge application, a selection of a data structure from a database, the data structure corresponding to data;
receiving, at the merge application, a selection of an envelope template comprising an extensible markup language (XML);
employing, at the merge application, the master document template to produce an electronic set of documents, wherein at least one document of the electronic set of documents corresponds to at least one slave document template of the plurality of slave document templates; and
populating the at least one document of the electronic set of documents with the data,
wherein selection of the data is based on at least bookmarks,
wherein placement of the data within the at least one document is based on at least placeholders, and
wherein the at least one slave document template comprises the bookmarks and the placeholders.

2. The method of claim 1, wherein the envelope template is specified in a format independent of an underlying document processing application.

3. The method of claim 1, further comprising:
producing envelopes corresponding to the electronic set of documents based on at least the envelope template and the data structure.

4. The method of claim 1, further comprising printing the electronic set of documents.

5. The method of claim 1, wherein the data structure in the database is specified in a format independent of an underlying application of each document.

6. The method of claim 1, further comprising using a number of slave templates with common content, common placeholders, and common bookmarks to create differing corresponding documents, where each differing corresponding document is differentiated according to the data at the placeholders in the slave template.

7. A non-transitory computer-readable storage medium having instructions that cause a processor executing the instructions to effectuate operations, the operations comprising:
receiving, at the merge application, a selection of a master document template specifying a plurality of slave document templates;
receiving, at the merge application, a selection of a data structure from a database, the data structure corresponding to data;
receiving, at the merge application, a selection of an envelope template comprising an extensible markup language (XML);
employing, at the merge application, the master document template and the data structure to produce an electronic set of documents, wherein at least one document of the electronic set of documents corresponds to at least one of the slave document templates; and
populating the at least one document of the electronic set of documents with the data,
wherein selection of the data is based on at least bookmarks,
wherein placement of the data within the at least one document is based on at least placeholders, and
wherein the at least one slave document template comprises the bookmarks and the placeholders.

8. The non-transitory computer-readable medium of claim 7, wherein the envelope template is specified in a format independent of an underlying document processing application.

9. The non-transitory computer-readable medium of claim 7, the operations further comprising
producing envelopes corresponding to the electronic set of documents based on at least the envelope template and the data structure.

10. The non-transitory computer-readable medium of claim 7, wherein the data structure is a structured query language (SQL) data structure and the database is an SQL database.

11. The non-transitory computer-readable medium of claim 7, wherein the data structure in the database is specified in a format independent of an underlying application of each document.

12. The non-transitory computer-readable medium of claim 7, the operations further comprising using a number of slave templates with common content, common placeholders, and common bookmarks to create differing corresponding documents, wherein each differing corresponding document is differentiated according to the data at the placeholders in the slave template.

13. A system comprising:
a processor; and
memory comprising instructions that cause the processor to effectuate operations, the operations comprising:
receiving, at a merge application, a selection of a master document template specifying a plurality of slave document templates;
receiving, at the merge application, a selection of a data structure from a database, the data structure corresponding to data, wherein the data structure in the database is specified in a format independent of the underlying application of each document;
receiving, at the merge application, a selection of an envelope template comprising an extensible markup language (XML);
employing, at the merge application, the master document template and the data structure to produce an electronic set of documents, wherein at least one document of the electronic set of documents corresponds to at least one of the slave document templates; and
populating the at least one document of the electronic set of documents with the data, wherein selection of the data is based on at least bookmarks, wherein placement of the data within the at least one document is based on at least placeholders, and wherein the at least one slave document template comprises the bookmarks and the placeholders.

14. The system of claim 13, wherein the envelope template that is specified in a format independent of an underlying document processing application.

15. The system of claim 13, the operations further comprising producing envelopes corresponding to the electronic set of documents by employing at the merge application the envelope template and the data structure.

16. The system of claim 13, the operations further comprising e-mailing the electronic set of documents to a set of recipients.

17. The system of claim 13, the operations further comprising using a number of slave templates with common content, common placeholders, and common bookmarks to create differing corresponding documents, wherein each differing corresponding document is differentiated according to the data at the placeholders in the slave template.

* * * * *